US009053112B2

(12) United States Patent
Rathod et al.

(10) Patent No.: US 9,053,112 B2
(45) Date of Patent: Jun. 9, 2015

(54) AUTOMATED DATA VALIDATION

(71) Applicant: Bank of America Corporation, Charlotte, NC (US)

(72) Inventors: Nitesh Rathod, Charlotte, NC (US); Sindhuja Subramani, Charlotte, NC (US); Christopher T. Walsh, Harrisburg, NC (US); James H. Peterson, Troutman, NC (US); Jayanta Sengupta, Charlotte, NC (US); Scott Murray, Charlotte, NC (US)

(73) Assignee: Bank of America Corporation, Charlotte, NC (US)

( * ) Notice: Subject to any disclaimer, the term of this patent is extended or adjusted under 35 U.S.C. 154(b) by 219 days.

(21) Appl. No.: 13/943,983

(22) Filed: Jul. 17, 2013

(65) Prior Publication Data
US 2015/0026136 A1 Jan. 22, 2015

(51) Int. Cl.
*G06F 17/30* (2006.01)

(52) U.S. Cl.
CPC .... *G06F 17/30082* (2013.01); *G06F 17/30595* (2013.01); *G06F 17/30371* (2013.01)

(58) Field of Classification Search
CPC ................................................ G06F 17/30089
See application file for complete search history.

(56) References Cited

U.S. PATENT DOCUMENTS

| 6,151,608 | A  | 11/2000 | Abrams |
| 7,117,228 | B2 | 10/2006 | Tomita et al. |
| 7,149,746 | B2 | 12/2006 | Fagin et al. |
| 7,590,670 | B2 | 9/2009  | Sasaki et al. |
| 7,865,477 | B2 | 1/2011  | Larcheveque et al. |
| 7,913,159 | B2 | 3/2011  | Larcheveque et al. |
| 8,209,362 | B2 | 6/2012  | Fong et al. |
| 8,307,012 | B2 | 11/2012 | Thomas |
| 2004/0139111 | A1 | 7/2004 | Schoettger et al. |
| 2007/0220022 | A1 | 9/2007 | Lankinen et al. |
| 2009/0307250 | A1 | 12/2009 | Koifman et al. |
| 2010/0057673 | A1 | 3/2010 | Savov |
| 2011/0060719 | A1 | 3/2011 | Kapoor |
| 2011/0072027 | A1 | 3/2011 | Wu et al. |
| 2011/0099170 | A1 | 4/2011 | Golani et al. |

FOREIGN PATENT DOCUMENTS

| JP | 111232149 | 2/1998 |
| JP | 1263824   | 5/2012 |

*Primary Examiner* — Mohammad S Rostami
(74) *Attorney, Agent, or Firm* — Michael A. Springs

(57) ABSTRACT

According to some embodiments, logic executing on a processor receives a request to compare a first file and a second file. Each file comprises records, attributes, and attribute values. An attribute value is a value that a record associates with a corresponding attribute. The logic receives a mapping file indicating a key and one or more selected attributes for comparison. The logic compares each record in the first file to its corresponding record in the second file, the corresponding record determined according to the key. For records that fail to match, the logic determines which of the selected attributes are unmatched. The logic communicates a report indicating a result of comparing the first file and the second file.

18 Claims, 2 Drawing Sheets

AUTOMATED DATA VALIDATION

TECHNICAL FIELD OF THE INVENTION

The present invention relates generally to data stores and more specifically to a system and method for automated data validation.

BACKGROUND OF THE INVENTION

Extract, Transform, Load (ETL) processes may refer to functionality that pulls data out of one data store and place it into another data store. Extract may refer to the process of reading data from a source data store. Transform may refer to the process of converting the extracted data into a format supported by a target data store, for example, by using rules or lookup tables or by combining the data with other data. Load may refer to the process of writing the transformed data into the target data store. ETL may be used to migrate data from one data store to another, to form a data warehouse, and/or to convert data stores from one format to another.

SUMMARY OF THE INVENTION

According to some embodiments, logic executing on a processor receives a request to compare a first file and a second file. Each file comprises records, attributes, and attribute values. An attribute value is a value that a record associates with a corresponding attribute. The logic receives a mapping file indicating a key and one or more selected attributes for comparison. The logic compares each record in the first file to its corresponding record in the second file, the corresponding record determined according to the key. For records that fail to match, the logic determines which of the selected attributes are unmatched. The logic communicates a report indicating a result of comparing the first file and the second file.

Certain embodiments of the invention may provide one or more technical advantages. In some embodiment, a mapping file may be used to indicate attributes to compare during data validation. Indicating the attributes in a mapping file may facilitate comparing two files that do not have the same number of attributes or that do not sort the attributes in the same order. Moreover, the mapping file may provide a generic format for comparing data without having to know any metadata or other specific details about the files. Accordingly, in some embodiments, the two files being compared may have different formats. For example, one file may have a sequential format and the other file may have a dataset format. In some embodiments, automated data validation may allow large volumes of data to be compared efficiently. As an example, automated data validation may determine and remove certain data that does not need to be compared so that resources may be focused on smaller files containing the data to be compared. Accordingly, bandwidth, computational resources, and memory may be conserved. In some embodiments, automated data validation may partition the data into smaller volumes that may be processed in parallel at high speed, for example, using grid computing.

Certain embodiments of the invention may include none, some, or all of the above technical advantages. One or more other technical advantages may be readily apparent to one skilled in the art from the figures, descriptions, and claims included herein.

BRIEF DESCRIPTION OF THE DRAWINGS

For a more complete understanding of the present invention and its features and advantages, reference is now made to the following description, taken in conjunction with the accompanying drawings, in which.

DETAILED DESCRIPTION OF THE INVENTION

Figure 1:
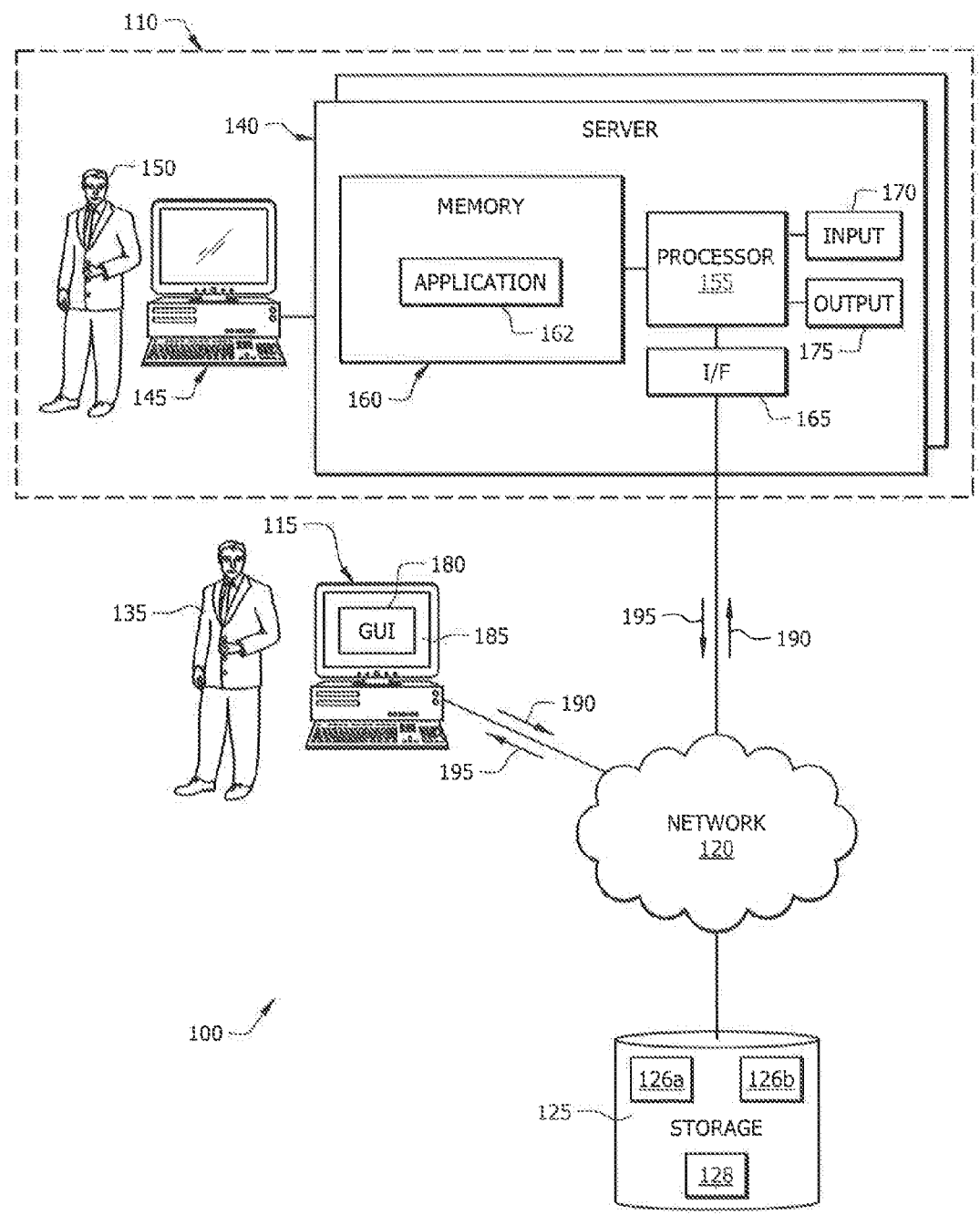
FIG. 1 illustrates an example of a system for automated data validation.
Figure 2:
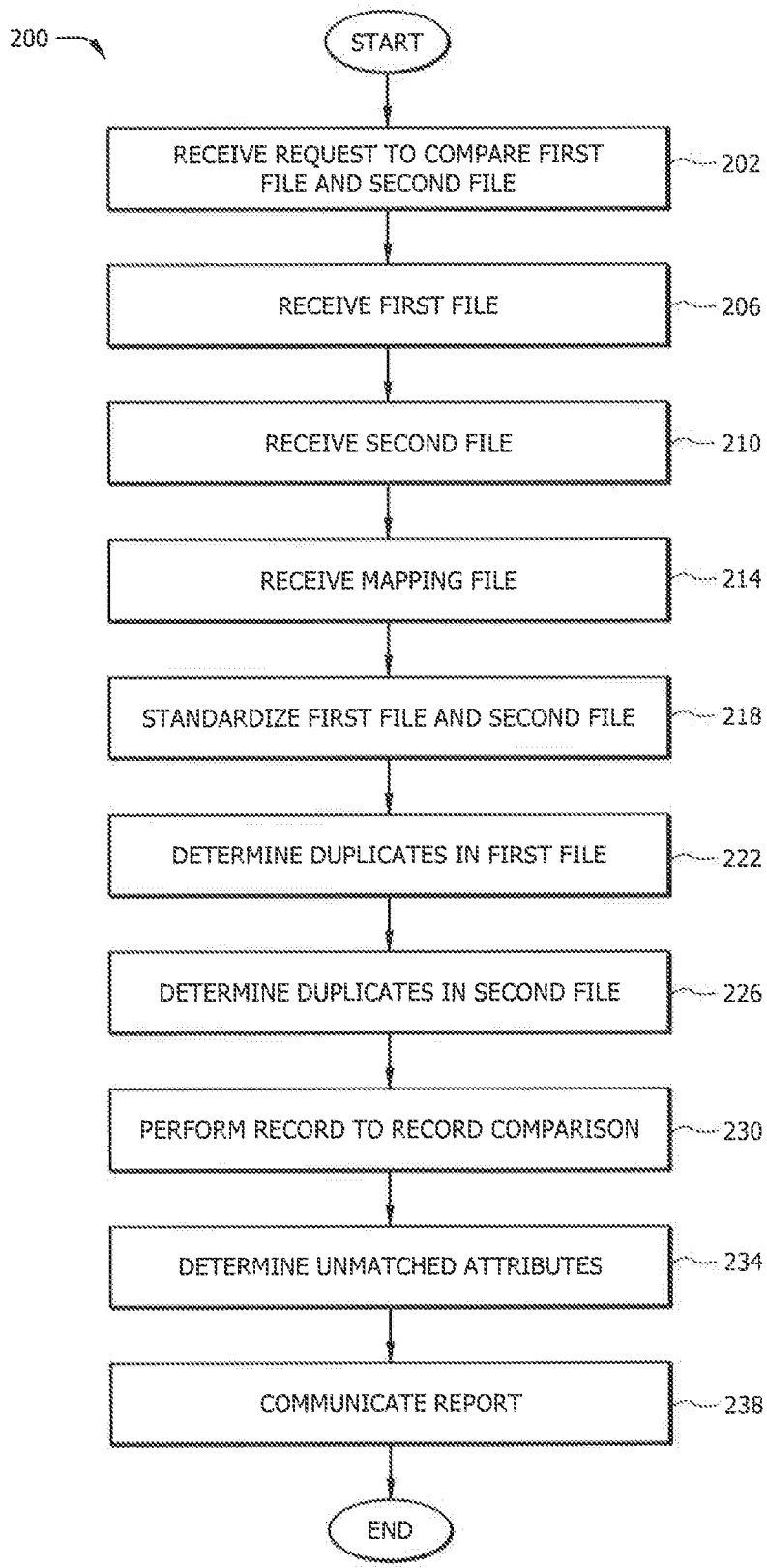
FIG. 2 illustrates an example of a method for automated data validation.

Embodiments of the present invention and its advantages are best understood by referring to FIGS. 1 through 2 of the drawings, like numerals being used for like and corresponding parts of the various drawings.

Extract, Transform, Load (ETL) processes may refer to functionality that pulls data out of one data store and place it into another data store. Extract may refer to the process of reading data from a source data store. Transform may refer to the process of converting the extracted data into a format supported by a target data store, for example, by using rules or lookup tables or by combining the data with other data. Load may refer to the process of writing the transformed data into the target data store. ETL may be used to migrate data from one data store to another, to form a data warehouse, and/or to convert data stores from one format to another. Unfortunately, the process of transforming the data may be prone to errors. Embodiments of the present invention may facilitate finding and correcting errors in the transform process. For example, in some embodiments extracted data may be compared to transformed data to identify discrepancies, such as missing data or differences in the data that indicate the presence of an error in the transform process. Although the preceding example has been described with respect to ETL processes, the systems and methods disclosed herein may also apply to testing processes, control processes, or other processes for which it is desirable to validate the quality of data.

FIG. 1 illustrates a system 100 according to certain embodiments. System 100 may include enterprise 110, one or more clients 115, a network storage device 125, one or more servers 140, and one or more users 135. Enterprise 110, clients 115, and network storage device 125 may be communicatively coupled by a network 120. System 100 may facilitate comparing a first file 126a and a second file 126b to identify discrepancies. As an example, in some embodiments first file 126a may be formatted for a legacy system and second file 126b may be formatted for a new system. The comparison may be used to confirm that data has been accurately migrated from the legacy system to the new system.

In general, user 135 utilizes client 115 to interact with server 140 to request automated data validation. For example, user 135 provides a request 190 to server 140 utilizing client 115. Request 190 may comprise one or more messages and may include any suitable fields to facilitate comparing first file 126a with second file 126b. An example of request 190 is described in more detail with respect to Table 1 below.

Client 115 may refer to any device that enables user 135 to interact with server 140. In some embodiments, client 115 may include a computer, workstation, telephone, Internet browser, electronic notebook, Personal Digital Assistant (PDA), pager, Automatic Teller Machine (ATM) or any other suitable device (wireless, wireline, or otherwise), component, or element capable of receiving, processing, storing, and/or communicating information with other components of system 100. Client 115 may also comprise any suitable user interface such as a display 185, microphone, keyboard, credit card reader, check reader, or any other appropriate terminal equipment usable by a user 135. It will be understood that system 100 may comprise any number and combination of clients 115.

In some embodiments, client 115 may include a graphical user interface (GUI) 180. GUI 180 is generally operable to tailor and filter data entered by and presented to user 135. GUI 180 may provide user 135 with an efficient and user-friendly presentation of request 190 and/or response 195. GUI 180 may comprise a plurality of displays having interactive fields, pull-down lists, and buttons operated by user 135. GUI 180 may include multiple levels of abstraction including groupings and boundaries. It should be understood that the term GUI 180 may be used in the singular or in the plural to describe one or more GUIs 180 and each of the displays of a particular GUI 180. In some embodiments, GUI 180 may display one or more reports, such as the reports described with respect to Tables 8, 9, and 13-15 below.

In some embodiments, network storage device 125 may refer to any suitable device communicatively coupled to network 120 and capable of storing and facilitating retrieval of data and/or instructions. Examples of network storage device 125 include computer memory (for example, Random Access Memory (RAM) or Read Only Memory (ROM)), mass storage media (for example, a hard disk), removable storage media (for example, a Compact Disk (CD) or a Digital Video Disk (DVD)), database and/or network storage (for example, a server), and/or or any other volatile or non-volatile, non-transitory computer-readable memory devices that store one or more files, lists, tables, or other arrangements of information. Network storage device 125 may store any data and/or instructions utilized by server 140. In some embodiments, network storage device may store first file 126a, second file 126b, a mapping file 128, scripts for running the automated data validation, and/or other data.

In certain embodiments, network 120 may refer to any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network such as the Internet, a wireline or wireless network, an enterprise intranet, or any other suitable communication link, including combinations thereof.

In some embodiments, enterprise 110 may refer to a financial institution such as a bank and may include one or more servers 140, an operator workstation 145, and an operator 150. In some embodiments, server 140 may refer to any suitable combination of hardware and/or software implemented in one or more modules to process data and provide the described functions and operations. In some embodiments, the functions and operations described herein may be performed by a pool of servers 140. In some embodiments, server 140 may include, for example, a mainframe, server, host computer, workstation, web server, file server, a personal computer such as a laptop, or any other suitable device operable to process data. In some embodiments, server 140 may execute any suitable operating system such as IBM's zSeries/Operating System (z/OS), MS-DOS, PC-DOS, MAC-OS, WINDOWS, UNIX, OpenVMS, or any other appropriate operating systems, including future operating systems. In some embodiments, server 140 may be a mid-range server utilizing IBM's Information Server ETL software. In some embodiments, server 140 may interface with a mainframe computer configured as a database that contains one or more files 126.

In some embodiments, servers 140 may include a processor 155, server memory 160, an interface 165, an input 170, and an output 175. Server memory 160 may refer to any suitable device capable of storing and facilitating retrieval of data and/or instructions. Examples of server memory 160 include computer memory (for example, RAM or ROM), mass storage media (for example, a hard disk), removable storage media (for example, a CD or a DVD), database and/or network storage (for example, a server), and/or or any other volatile or non-volatile, non-transitory computer-readable memory devices that store one or more files, lists, tables, or other arrangements of information. Although FIG. 1 illustrates server memory 160 as internal to server 140, it should be understood that server memory 160 may be internal or external to server 140, depending on particular implementations. Also, server memory 160 may be separate from or integral to other memory devices to achieve any suitable arrangement of memory devices for use in system 100.

Server memory 160 is generally operable to store an application 162. Application 162 generally refers to logic, rules, algorithms, code, tables, and/or other suitable instructions for performing the described functions and operations. In some embodiments, application 162 facilitates automated data validation, as discussed in more detail with respect to FIG. 2 below.

Server memory 160 communicatively couples to processor 155. Processor 155 is generally operable to execute application 162 stored in server memory 160 to validate data according to the disclosure. Processor 155 may comprise any suitable combination of hardware and software implemented in one or more modules to execute instructions and manipulate data to perform the described functions for servers 140. In some embodiments, processor 155 may include, for example, one or more computers, one or more central processing units (CPUs), one or more microprocessors, one or more applications, and/or other logic.

In some embodiments, communication interface 165 (I/F) is communicatively coupled to processor 155 and may refer to any suitable device operable to receive input for server 140, send output from server 140, perform suitable processing of the input or output or both, communicate to other devices, or any combination of the preceding. Communication interface 165 may include appropriate hardware (e.g., modem, network interface card, etc.) and software, including protocol conversion and data processing capabilities, to communicate through network 120 or other communication system, which allows server 140 to communicate to other devices. Communication interface 165 may include any suitable software operable to access data from various devices such as clients 115 and/or network storage device 125. Communication interface 165 may also include any suitable software operable to transmit data to various devices such as clients 115 and/or network storage device 125. Communication interface 165 may include one or more ports, conversion software, or both. In general, communication interface 165 receives request 190 from clients 115 and transmits response 195 to clients 115.

In some embodiments, input device 170 may refer to any suitable device operable to input, select, and/or manipulate various data and information. Input device 170 may include, for example, a keyboard, mouse, graphics tablet, joystick, light pen, microphone, scanner, or other suitable input device. Output device 175 may refer to any suitable device operable for displaying information to a user. Output device 175 may include, for example, a video display, a printer, a plotter, or other suitable output device.

In general, operator 150 may interact with server 140 using an operator workstation 145. In some embodiments, operator workstation 145 may be communicatively coupled to server 140 and may refer to any suitable computing system, workstation, personal computer such as a laptop, or any other device operable to process data. In certain embodiments, an operator 150 may utilize operator workstation 145 to manage server 140 and any of the data stored in server memory 160 and/or network storage device 125.

In operation, application 162, upon execution by processor 155, facilitates validating data. For example, application 162 receives user 135's request 190 to perform automated data validation based on first file 126a and second file 126b. Application 162 determines a mapping file 128. Application 162 may compare first file 126a and second file 126b according to mapping file 128. Application 162 may then communicate response 195 to user 135. In some embodiments, response 195 may comprise one or more reports containing the result of comparing first file 126a and second file 126b. In some embodiments a report may include statistics indicating a number of mismatches between first file 126a and second file 126b. In some embodiments, a report may include a description of mismatched attribute values. As an example, the description may indicate that first file 126a lists Customer X as the owner of Account xxx-1 whereas second file 126b lists a different customer, Customer Y, as the owner of Account xxx-1.

In some embodiments, user 135 may use the report to identify a problem in the process of transforming the data from a format associated with first file 126a (e.g., a legacy format) to a format associated with second file 126b (e.g., a new format). User 135 may update the process of transforming the data to correct the problems and may generate an updated first file 126a and/or second file 126b. User 135 may run the automated data validation on the updated files 126 to confirm that the mismatch has been corrected. In the example, the mismatch may be considered corrected if updated first file 126a and updated second file 126b both show the same customer as the owner of Account xxx-1.

In some embodiments, user 135 may opt to run the automated data validation again using a different or modified mapping file 128. In the example, once user 135 is satisfied that the customers' names are being transformed correctly, user 135 may choose to update mapping file 128 to expand the attribute set being validated, for example, to ensure that address and phone number are also being transformed properly.

Although the preceding example describes that processor(s) 155 associated with server 140 execute application 162, in alternate embodiments application 162 may be configured to be executed at client 115 (independently of server 140). That is, client 115 may be configured locally with one or more processors 155, memories 160, applications 162, interfaces 165, inputs 170, outputs 175, and/or other components capable of performing some or all of the steps of the automated data validation at client 115.

FIG. 2 illustrates an example of a method 200 for performing automated data validation according to certain embodiments. In some embodiments, method 200 may be performed by processor 155 executing application 162. The method begins at step 202 where processor 155 receives request 190 to compare first file 126a to second file 126b. Request 190 may comprise any suitable information for requesting automated data validation. Table 1 provides examples of information that may be included in request 190, such as one or more of First File Information, Second File Information, Mapping File Information, Report Information, Automated Data Validation Tool Information, Notification Information, a Tolerance Value, a Grid Configuration, and/or Other Information.

TABLE 1

Example Request Message

| Parameter Name | Description |
| --- | --- |
| First File Information | First file information may include the name of first file 126a, the location of first file 126a (e.g., the file path), the format of first file 126a (e.g., dataset, sequential, etc.), an indicator whether or not first file 126a includes a header record, and/or other information describing first file 126a. |
| Second File Information | Second file information may include the name of second file 126b, the location of second file 126b (e.g., the file path), the format of second file 126b (e.g., dataset, sequential, etc.), an indicator whether or not second file 126b includes a header record, and/or other information describing second file 126b. |
| Mapping File Information | The mapping file information may include the name of mapping file 128, the location of mapping file 128 (e.g., the file path), and/or other information describing mapping file 128. |
| Report Information | The report information may include information describing the output files to be generated as a result of processing request 190. For example, the report information may include text to include in the filename(s) of the output file(s), a run identifier (e.g., run number 1, 2, 3, . . . n), a process date (e.g., YYYYMMDD), a location to store the output file(s) (e.g., a file path), the type of report(s) requested (e.g., summary, detailed, statistical), and/or other information describing the report. |
| Automated Data Validation Tool Information | The automated data validation tool information may include information describing the ADV comparison tool, such as the name of the script(s) to run, the location of the script(s), the environment to which the script(s) apply, or other suitable information. |
| Notification Information | The notification information may indicate sender(s) and/or recipient(s) associated with the output files. For example, the notification information may indicate to send the output files from a sender's email address to one or more recipients' email addresses. In some embodiments, notification information may include an email server designated to send the notification. The notification may include the output files or may notify the recipients that the output files have been generated (e.g., the output files are available at the output file location). |
| Tolerance Value(s) | The tolerance value may describe how many records should be passed after a row to row comparison or written to the output files. As an example, a tolerance value of "0" may indicate that everything should be written to the output files. A higher (non-zero) tolerance value may indicate to reduce the number of records written to the output files, for example, in order to reduce the number of duplicate records in the output files. |

TABLE 1-continued

Example Request Message

| Parameter Name | Description |
| --- | --- |
| Grid Configuration | The grid configuration may include information to facilitate parallel processing, such as the number of nodes to use, the number of partitions to use, which queue(s) to submit the job to, or other parallel processing configuration. |
| Other Information | Other information may include any other suitable information for requesting automated data validation. |

At step 206, processor 155 receives first file 126a. In some embodiments, processor 155 may retrieve first file 126a from a source data store. A data store may refer to a data repository of a set of data. Examples of a data store include, but are not limited to, a database, a spreadsheet, a file system, a directory service, or other set of data that associates an attribute with an attribute value. In some embodiments, processor 155 may retrieve first file 126a from a location in network storage device 125 indicated by request 190. Table 2 provides an example of first file 126a.

TABLE 2

Example First File

| Account | First_Name | Last_Name | City | Zip | Phone |
| --- | --- | --- | --- | --- | --- |
| xxx-1 | First_1 | Last_1 | City_1 | 11111 | xxx-xxx1 |
| xxx-2 | First_2 | Last_2 | City_2 | 22222 | xxx-xxx2 |
| xxx-2 | First_2 | Last_2 | City_2 | 22222 | xxx-xxx2 |
| xxx-3 | First_3 | Last_3 | City_3 | 33333 | xxx-xxx3 |
| xxx-4 | First_4 | Last_4 | City_4 | 44444 | xxx-xxx4 |
| xxx-5 | First_5 | Last_5 | City_5 | 55555 | xxx-xxx5 |

First file 126a may comprise one or more records. In some embodiments, each row of first file 126a may correspond to a unique record. For example, each record may comprise an account number and information about the account holder associated with that account number (e.g., first name, last name, city, zip code, phone number). Each column of first file 126a may correspond to a unique attribute. First file 126a may have any suitable format. As an example, first file 126a may be in the format of a DataStage™ parallelized dataset. As another example first file 126a may be in the format of a sequential file with an associated schema. The sequential file may include a header record or, in the alternative, the sequential file may omit a header record. In some embodiments, a legacy system may provide first file 126a.

At step 210, processor 155 receives second file 126b. In some embodiments, processor 155 may retrieve second file 126b from a location in network storage device 125 indicated by request 190. Table 3 provides an example of second file 126b.

TABLE 3

Example Second File

| Account | Given_Name | Last_Name | City | Zip |
| --- | --- | --- | --- | --- |
| xxx-1 | First_1 | Last_1 | City_A | 11111 |
| xxx-2 | First_2 | Last_2 | City_2 | 22222 |
| xxx-3 | First_3 | Last_3 | City_3 | 33333 |
| xxx-4 | First_4 | Last_4 | City_4 | 44444 |

Second file 126b may comprise one or more records and may have any suitable format. Second file 126b may have the same format as first file 126a or a different format. The number of records in second file 126b may be greater than, less than, or equal to the number of records in first file 126a. The records in second file 126b may be arranged/sorted in the same order as the records in first file 126a, or the records may be arranged in a different order. The number of attributes in second file 126b may be the greater than, less than, or equal to the number of attributes in first file 126a. The attributes in second file 126b may be arranged/sorted in the same order as the attributes in first file 126a, or the attributes may be arranged in a different order. In some embodiments, a new (non-legacy) system may provide second file 126b.

Processor 155 receives mapping file 128 at step 214. Mapping file 128 may comprise one or more keys and one or more attributes associated with each key. Table 4 illustrates an example of a mapping file 128 for comparing the example files 126a and 126b described with respect to Tables 2 and 3 above.

TABLE 4

Example Mapping File
Mapping File

Key=Account
Attribute=First_Name=Given_Name
Attribute=Last_Name
Attribute=City

An attribute describes a component of the data store, such as a field. In the example of first file 126a and second file 126b, each column may correspond to an attribute. Mapping file 128 may indicate a subset of some or all of the attributes to validate.

A key is a type of attribute used to determine which records to compare. That is, records in which the key value in first file 126a corresponds to the key value in second file 126b will be compared during the comparison steps that are described in more detail at step 230 and step 234 below. In Table 4 above, mapping file 128 indicates that the account number is the key. Thus, the record having a key value of xxx-1 in first file 126a will be compared to the record having a key value of xxx-1 in second file 126b. Comparing the records may comprise comparing the attribute value for each attribute that mapping file 128 associates with the key. With respect to account xxx-1 in first file 126a, the attribute value for the First_Name attribute corresponds to "First_1," the attribute value for the Last_Name attribute corresponds to "Last_1," and the attribute value for the City attribute corresponds to "City_1." With respect to account xxx-1 in second file 126b, the attribute value for the Given_Name attribute corresponds to "First_1," the attribute value for the Last_Name attribute corresponds to "Last_1," and the attribute value for the City attribute corresponds to "City_A."

In the example, mapping file 128 uses the structure Attribute=<first file attribute name>=<second file attribute name>. Accordingly, mapping file 128 indicates that an attribute called "First_Name" in first file 126a should be compared to an attribute called "Given_Name" in second file 126b. Because the other attributes (Account, Last Name, and City) do not indicate a second file attribute name, processor 155 assumes that the attribute name in first file 126a should be compared to an attribute having the same name in second file 126b. As an example, the attribute named "Last_Name" in first file 126a should be compared to the attribute named "Last_Name" in second file 126b.

Processor 155 may standardize first file 126a and second file 126b at step 218. Standardizing may include putting first file 126a and second file 126b into a shared format in order to facilitate a more efficient comparison. As an example, first file 126a and second file 126b may be formatted to either both include a header record or to both exclude a header record. As another example, first file 126a and second file 126b may be placed into a ",", or "|" delimited ASCII format with special characters removed. As another example, first file 126a and second file 126b may be formatted to omit data that does not appear in mapping file 128 and thus does not need to be compared. By omitting the data that does not need to be compared, the size of the files being compared may be reduced which may allow the comparison to progress more quickly. Data may be omitted using any suitable method. In some embodiments, files using a schema may be standardized by extracting and updating the schema to include the keys and attributes identified in mapping file 128 and to omit any attributes that do not appear in mapping file 128. In Table 5, first file illustrated in Table 2 above has been standardized according to the mapping file of Table 4:

TABLE 5

Standardized First File

| Account | First_Name | Last_Name | City |
|---|---|---|---|
| xxx-1 | First_1 | Last_1 | City_1 |
| xxx-2 | First_2 | Last_2 | City_2 |
| xxx-2 | First_2 | Last_2 | City_2 |
| xxx-3 | First_3 | Last_3 | City_3 |
| xxx-4 | First_4 | Last_4 | City_4 |
| xxx-5 | First_5 | Last_5 | City_5 |

In particular, the zip code and phone number columns have been omitted because mapping file 128 does not require validating these attributes.

In Table 6, second file illustrated in Table 3 above has been standardized according to the mapping file of Table 4:

TABLE 6

Standardized Second File

| Account | Given_Name | Last_Name | City |
|---|---|---|---|
| xxx-1 | First_1 | Last_1 | City_A |
| xxx-2 | First_2 | Last_2 | City_2 |
| xxx-3 | First_3 | Last_3 | City_3 |
| xxx-4 | First_4 | Last_4 | City_4 |

In particular, the zip code column has been omitted because mapping file 128 does not require validating the zip code.

At step 222, processor 155 determines duplicates in first file 126a. In some embodiments, records having the same key value may be determined to be duplicates. In some embodiments, duplicate entries may be removed from first file 126a and may be reported to a duplicate report. Continuing with the above example, the mapping file of Table 4 indicates that the "Account" column is the key being used to compare the records in first file 126a. First file 126a contains two records in which the account corresponds to "xxx-2." Accordingly, the duplicate instance of account xxx-2 may be removed from first file 126a, as shown in Table 7, and added to a duplicate report, as shown in Table 8.

TABLE 7

Standardized First File without Duplicates

| Account | First_Name | Last_Name | City |
|---|---|---|---|
| xxx-1 | First_1 | Last_1 | City_1 |
| xxx-2 | First_2 | Last_2 | City_2 |
| xxx-3 | First_3 | Last_3 | City_3 |
| xxx-4 | First_4 | Last_4 | City_4 |
| xxx-5 | First_5 | Last_5 | City_5 |

TABLE 8

Report of Duplicates in First File

| Account | First_Name | Last_Name | City |
|---|---|---|---|
| xxx-2 | First_2 | Last_2 | City_2 |

At step 226, processor 155 determines duplicates in second file 126b. In some embodiments, records having the same key value may be determined to be duplicates. In some embodiments, duplicate entries may be removed from second file 126b and may be reported to a duplicate report. Continuing with the above example, the mapping file of Table 4 indicates that the "Account" column is the key being used to compare the records in second file 126b. Second file 126b contains no records having duplicate account values. Because there are no duplicates in this example, the method may proceed without modifying second file 126b of Table 6.

Processor 155 performs a record to record comparison at step 230 to determine matching records. A record contains a key value and each of the attribute values associated with that key value. In the example above, each row corresponds to a record. Thus, the record to record comparison may be performed row by row. During step 230, processor 155 may determine that account xxx-1 of first file 126a does not match account xxx-1 of second file 126b because at least one of the entries in the xxx-1 row does not match. By contrast, account xxx-2 of first file 126a may be determined to match account xxx-2 of second file 126b because the entire row matches. Similarly, account xxx-3 of first file 126a may be determined to match account xxx-3 of second file 126b and account xxx-4 of first file 126a may be determined to match account xxx-4 of second file 126b. In some embodiments, matching records may be removed from first file 126a and second file 126b so that smaller files can be passed to the next step for efficient processing.

In the example, processor 155 may determine that first file 126a contains a record for account xxx-5, but second file 126b does not contain a record for account xxx-5. Because there are not any account xxx-5 attributes available to compare in second file 126b, processor 155 may remove the account xxx-5 record from first file 126a and report it in a list of records found only in first file 126a. Table 9 illustrates an example of a report listing records found only in first file 126a:

TABLE 9

Report of Records Found Only in the First File

| Account | First_Name | Last_Name | City |
|---|---|---|---|
| xxx-5 | First_5 | Last_5 | City_5 |

Table 10 illustrates an example of first file 126a with the matching records removed (accounts xxx-2, xxx-3, and xxx-4) and the records found only in first file 126a removed (account xxx-5).

TABLE 10

First File after Row to Row Comparison

| Account | First_Name | Last_Name | City |
|---|---|---|---|
| xxx-1 | First_1 | Last_1 | City_1 |

Table 11 illustrates an example of second file 126b with the matching records removed.

TABLE 11

| | Second File after Row to Row Comparison | | |
|---|---|---|---|
| Account | Given_Name | Last_Name | City |
| xxx-1 | First_1 | Last_1 | City_A |

At step 234, processor 155 determines unmatched attributes. In some embodiments, an attribute corresponds to a column and processor 155 determines unmatched attributes by performing a column to column comparison. For example, processor 155 may determine that account xxx-1 has an unmatched record in the city column because first file 126a lists the city as "City_1" and second file 126b lists a different city, "City_A."

In some embodiments, determining unmatched attributes may comprise applying transform rules. Transform rules may indicate non-identical attribute values that are equivalent to one another. Table 12 illustrates an example in which first file 126a has two separate columns for first name and last name, whereas, second file 126b has one column for a name in which the first name follows the last name and a comma. A transform rule indicates the subset of non-identical values that yield a match.

TABLE 12

| Example Transform Rules | | | |
|---|---|---|---|
| First File | | Second File | Report |
| First_Name | Last_Name | Name | Match |
| AAA | BBB | BBB, AAA | Yes |
| CCC | DDD | DDD, CCC | Yes |
| EEE | FFF | GGG, HHH | No |

In the example, the transform rule indicates that a match exists when the names are the same, and only the format is different (e.g., "AAA" with "BBB" matches "BBB, AAA"). The transform rule indicates that no match exists when the names are different (e.g., "EEE" with "FFF" does not match "GGG, HHH").

Processor 155 communicates one or more reports at step 238. In some embodiments, the report may be communicated to a location, such as a file path or an email address, indicated by request 190. In some embodiments, a notification may be communicated to one or more recipients indicated by request 190. The notification may include the report or may notify the recipients that the report has been prepared and/or where to locate the report. The report may have any suitable format. As an example, Table 13 illustrates an example of report containing each unmatched record, the attribute value of each attribute compared in first file 126a, the attribute value of each attribute compared in second file 126b, and an indicator indicating whether the attribute value in first file 126a matched the corresponding attribute value in second file 126b.

TABLE 13

| | Report of Unmatched Records, All Columns | | | | | | | | |
|---|---|---|---|---|---|---|---|---|---|
| Acct | First Name (1) | Given Name (2) | First Name Match | Last Name (1) | Last Name (2) | Last Name Match | City (1) | City (2) | City Match |
| xxx-1 | First_1 | First_1 | Yes | Last_1 | Last_1 | Yes | City_1 | City_A | No |

Table 14 illustrates an example of report containing each unmatched record and, for each unmatched attribute, the attribute value found in first file 126a and the attribute value found in second file 126b. This report omits the matched attributes.

TABLE 14

| | Report of Unmatched Records, Unmatched Columns | | | |
|---|---|---|---|---|
| Account | File 1 Column Name | File 1 Column Value | File 2 Column Name | File 2 Column Value |
| xxx-1 | City | City_1 | City | City_A |

In some embodiments, the report may include statistics, such as any one or more of the statistics illustrated in Table 15:

TABLE 15

| Report of Statistics | |
|---|---|
| Description | Value |
| Extracted Records in First File | 5 |
| Extracted Records in Second File | 4 |
| Number of Records Only in First File | 1 |
| Number of Records Only in Second File | 0 |
| Number of Unmatched Records | 1 |
| Percentage of Unmatched Records - excluding records found in only one file | 25% |
| Percentage of Unmatched Records - counting records found in only one file as unmatched | 40% |

In the example of Table 15, Extracted Records in First File may correspond to five records (accounts xxx-1, 2, 3, 4, and 5). Extracted Records in Second File may correspond to four records (accounts xxx-1, 2, 3, and 4). Number of Records Only in First File may correspond to one record (account xxx-5). Number of Records Only in Second File may correspond to zero records (because accounts xxx-1, 2, 3, and 4 also appear in first file 126a). Number of Unmatched records may correspond to one (the record for account xxx-1 in first file 126a did not match the record for account xxx-1 in second file 126b). Percentage of Unmatched Records—excluding records found in only one file may correspond to 25% because one record did not match (account xxx-1) out of four total records (accounts xxx-1, 2, 3, and 4) excluding records found in only one file (account xxx-5). Percentage of Unmatched Records—counting records found in only one file as unmatched may correspond to 40% because two records did not match (accounts xxx-1 and 5) out of five total records (accounts xxx-1, 2, 3, 4, and 5) including records found in only one file. After communicating the report at step 238, the method ends.

Table 16 illustrates another report format. The report provides an example for a different set of data than the example data discussed with respect to FIG. 2 above.

TABLE 16

Example Report

| | |
|---|---|
| Project Name | TEMPLATE_TEST |
| Environment | DEV |
| Run ID | 2 |
| Source File 1 Name | CNE_AHE_MF_20130514.ds |
| Source File 2 Name | CNE_AHE_ETL_20130514.ds |
| Mapping File Name | CNE_AHE_MAPPING_rel2.txt |
| Input Throttle Value | Unlimited |
| Output Throttle Value | Unlimited |
| Extracted Records in File 1 | 229521 |
| Extracted Records in File 2 | 143556 |
| Number Of Records Only In File_1 | 85967 |
| Number Of Records Only In File_2 | 2 |
| Number of Records Out-of-Sync | 143554 |

| OUT-OF-SYNC COLUMN NAMES | OUT-OF-SYNC COLUMN COUNTS |
|---|---|
| HARD_FAILURE_FLG | 980 |
| RESP_STATUS | 979 |
| DELSYS_UPD_DT | 983 |
| FINAL_RESP_STATUS2 | 775 |
| FINAL_RESP_STATUS1 | 980 |
| RECORD_TYPE | 143554 |

Modifications, additions, or omissions may be made to the systems described herein without departing from the scope of the invention. The components may be integrated or separated. Moreover, the operations may be performed by more, fewer, or other components. Additionally, the operations may be performed using any suitable logic comprising software, hardware, and/or other logic. As used in this document, "each" refers to each member of a set or each member of a subset of a set. A subset may include zero, one, or more members.

Modifications, additions, or omissions may be made to the methods described herein without departing from the scope of the invention. For example, the steps may be combined, modified, or deleted where appropriate, and additional steps may be added. Additionally, the steps may be performed in any suitable order without departing from the scope of the present disclosure. Moreover, although the preceding example has described arranging records according to rows and arranging keys and attributes according to columns, in other embodiments records may be arranged according to columns and keys and attributes may be arranged according to rows.

Certain embodiments of the invention may include one or more advantages. For example, certain embodiments may allow for quickly and efficiently validating large amounts of data. In some embodiments, data from a variety of platforms (e.g., mainframe, unix, etc.) and having a variety of formats (e.g., dataset, binary, text, sequential, ascii, etc.) may be compared. For example, the automated data validation application may standardize the format to facilitate a comparison. In some embodiments, the automated data validation application may determine data to compare using a generic mapping file without having to define metadata. That is, the mapping file indicates the attributes to compare and what key(s) to use, rather what format the data is in. In some embodiments, the ADV application may pass parameter(s) indicating the format the data is in (ASCII, Dataset, etc.). The application may make a number of assumptions based on the format and treat accordingly. Metadata may be taken directly from passed files (Datasets, schema, etc.) depending on the parameter(s) passed.

The mapping file may be modified to compare any subset of attributes that the user wishes to compare. In some embodiments, the automated data validation application may provide flexibility by allowing files to be compared that do not have the same number of rows or columns or that do not sort the rows and/or columns in the same order. In some embodiments, the automated data validation application may partition the data into smaller volumes that may be processed in parallel at high speed, for example, using grid computing. Parallel processing may reduce the amount of time required to validate the data.

Certain embodiments of the invention may include none, some, or all of the above technical advantages. One or more other technical advantages may be readily apparent to one skilled in the art from the figures, descriptions, and claims included herein.

Although the present invention has been described in detail, it should be understood that various changes, substitutions, and alterations can be made hereto without departing from the scope of the invention as defined by the appended claims.

What is claimed is:

1. A system, comprising:
   an interface operable to:
      receive a request to compare a first file and a second file;
      receive the first file, the first file comprising:
         a first plurality of attributes;
         a first plurality of records; and
         a first plurality of attribute values, wherein each attribute value corresponds to a value that one of the first plurality of records associates with a corresponding one of the first plurality of attributes;
      receive the second file, the second file comprising:
         a second plurality of attributes;
         a second plurality of records; and
         a second plurality of attribute values, wherein each attribute value corresponds to a value that one of the second plurality of records associates with a corresponding one of the second plurality of attributes; and
      receive a mapping file, the mapping file indicating a key and one or more selected attributes for comparison; and one or more processors communicatively coupled to the interface and operable to:
  format the first file and the second file according to a standard format, comprising:
    removing any attributes from the first plurality of attributes that fail to correspond to the selected attributes indicated by the mapping file; and
    removing any attributes from the second plurality of attributes that fail to correspond to the selected attributes indicated by the mapping file;
  determine matched records and unmatched records by:
    comparing each record of the first plurality of records to a corresponding record of the second plurality of records, the corresponding record determined according to the key;
    determining the each record and the corresponding record are matched records if each of the attribute values associated with the first record matches a corresponding attribute value associated with the corresponding record; and
    determining the each record and the corresponding record are unmatched records if at least one of the attribute values associated with the first record fails to match the corresponding attribute value associated with the corresponding record;
  remove any matched records; and
  after removing the matched records, determine the unmatched attributes associated with each unmatched record;
the interface further operable to:
  communicate a report indicating a result of comparing the first file and the second file.

2. The system of claim 1, wherein the one or more processors operable to:
  determine a duplicate record in the first file, the duplicate record having a same key value as another record in the first file;
  remove the duplicate record from the first file; and
  communicate a duplicate report identifying the duplicate record.

3. The system of claim 1, wherein the one or more processors operable to partition the first file and the second file in order to facilitate using parallel processing to compare the first file and the second file.

4. The system of claim 1, further comprising determining the each record and the corresponding record are matched records if a transform rule indicates the attribute values associated with the first record are equivalent to the corresponding attribute values associated with the corresponding record.

5. The system of claim 1, wherein the interface receives the first file in one of a dataset format or a sequential format and the interface receives the second file in the other of the dataset format or the sequential format.

6. The system of claim 1, wherein for each selected attribute of the unmatched records, the report indicates:
  the attribute value that the each record associates with the selected attribute;
  the attribute value that the corresponding record associates with the selected attribute; and
  an indicator indicating whether the attribute value that the each record associates with the selected attribute matches the attribute value that the corresponding record associates with the selected attribute.

7. The system of claim 1, wherein the report includes statistics indicating a total number of records compared and a number of unmatched records.

8. A non-transitory computer readable storage medium comprising logic, the logic, when executed by a processor, operable to:
  receive a request to compare a first file and a second file;
  receive the first file, the first file comprising:
    a first plurality of attributes;
    a first plurality of records; and
    a first plurality of attribute values, wherein each attribute value corresponds to a value that one of the first plurality of records associates with a corresponding one of the first plurality of attributes;
  receive the second file, the second file comprising:
    a second plurality of attributes;
    a second plurality of records; and
    a second plurality of attribute values, wherein each attribute value corresponds to a value that one of the second plurality of records associates with a corresponding one of the second plurality of attributes;
  receive a mapping file, the mapping file indicating a key and one or more selected attributes for comparison;
  format the first file and the second file according to a standard format by:
    removing any attributes from the first plurality of attributes that fail to correspond to the selected attributes indicated by the mapping file; and
    removing any attributes from the second plurality of attributes that fail to correspond to the selected attributes indicated by the mapping file;
  determine matched records and unmatched records by:
    comparing each record of the first plurality of records to a corresponding record of the second plurality of records, the corresponding record determined according to the key;
    determining the each record and the corresponding record are matched records if each of the attribute values associated with the first record matches a corresponding attribute value associated with the corresponding record; and
    determining the each record and the corresponding record are unmatched records if at least one of the attribute values associated with the first record fails to match the corresponding attribute value associated with the corresponding record;
  remove any matched records; and
  after removing the matched records, determine the unmatched attributes associated with each unmatched record;
  communicate a report indicating a result of comparing the first file and the second file.

9. The medium claim 8, wherein the logic operable to:
  determine a duplicate record in the first file, the duplicate record having a same key value as another record in the first file;
  remove the duplicate record from the first file; and
  communicate a duplicate report identifying the duplicate record.

10. The medium of claim 8, wherein the logic operable to partition the first file and the second file in order to facilitate using parallel processing to compare the first file and the second file.

11. The medium of claim 8, wherein the logic operable to determine the each record and the corresponding record are matched records if a transform rule indicates the attribute values associated with the first record are equivalent to the corresponding attribute values associated with the corresponding record.

12. The medium of claim 8, wherein the logic receives the first file in one of a dataset format or a sequential format and the logic receives the second file in the other of the dataset format or the sequential format.

13. The medium of claim 8, wherein the report comprises an indicator indicating whether, for each selected attribute, the attribute value that the each record associates with the selected attribute matches the attribute value that the corresponding record associates with the selected attribute.

14. The medium of claim 8, wherein the report includes statistics indicating a total number of records compared and a number of unmatched records.

15. A method, comprising:
receiving a request to compare a first file and a second file;
receiving the first file, the first file comprising:
    a first plurality of attributes;
    a first plurality of records; and
    a first plurality of attribute values, wherein each attribute value corresponds to a value that one of the first plurality of records associates with a corresponding one of the first plurality of attributes;
receiving the second file, the second file comprising:
    a second plurality of attributes;
    a second plurality of records; and
    a second plurality of attribute values, wherein each attribute value corresponds to a value that one of the second plurality of records associates with a corresponding one of the second plurality of attributes;
receiving a mapping file, the mapping file indicating a key and one or more selected attributes for comparison;
formatting the first file and the second file according to a standard format by:
    removing any attributes from the first plurality of attributes that fail to correspond to the selected attributes indicated by the mapping file; and
    removing any attributes from the second plurality of attributes that fail to correspond to the selected attributes indicated by the mapping file;
determining, by a processor, matched records and unmatched records by:
    comparing each record of the first plurality of records to a corresponding record of the second plurality of records, the corresponding record determined according to the key;
    determining the each record and the corresponding record are matched records if each of the attribute values associated with the first record matches a corresponding attribute value associated with the corresponding record; and
    determining the each record and the corresponding record are unmatched records if at least one of the attribute values associated with the first record fails to match the corresponding attribute value associated with the corresponding record;
removing any matched records; and
after removing the matched records, determining the unmatched attributes associated with each unmatched record;
communicating a report indicating a result of comparing the first file and the second file.

16. The method claim 15, the determining the matched records performed according to a transform rule that indicates the attribute values associated with the first record are equivalent to the corresponding attribute values associated with the corresponding record.

17. The method of claim 15, wherein the report comprises an indicator indicating whether, for each selected attribute, the attribute value that the each record associates with the selected attribute matches the attribute value that the corresponding record associates with the selected attribute.

18. The method of claim 15, wherein the report includes statistics indicating a total number of records compared and a number of unmatched records.

* * * * *